United States Patent
Narasimalu

(10) Patent No.: US 8,186,936 B2
(45) Date of Patent: May 29, 2012

(54) ACTUATION OF MOVABLE PARTS OF A WIND TURBINE ROTOR BLADE

(75) Inventor: Srikanth Narasimalu, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 2 days.

(21) Appl. No.: 12/795,913

(22) Filed: Jun. 8, 2010

(65) Prior Publication Data

US 2010/0310372 A1    Dec. 9, 2010

Related U.S. Application Data

(60) Provisional application No. 61/184,882, filed on Jun. 8, 2009.

(30) Foreign Application Priority Data

Jun. 8, 2009    (DK) .................................. 2009 00708

(51) Int. Cl.
*F03D 1/06* (2006.01)
*F03D 7/02* (2006.01)

(52) U.S. Cl. ........................ 415/18; 416/132 B; 416/155

(58) Field of Classification Search ................... 415/4.3, 415/4.5, 18, 217.1, 907; 416/32, 132 B, 416/134 R, 155, 169 R, 205, 241 R
See application file for complete search history.

(56) References Cited

U.S. PATENT DOCUMENTS

| | | | | |
|---|---|---|---|---|
| 2,485,543 | A * | 10/1949 | Andreau | 60/398 |
| 2,622,686 | A * | 12/1952 | Chevreau et al. | 416/23 |
| 2,624,531 | A | 1/1953 | Stalker | |
| 2,716,460 | A | 8/1955 | Young | |
| 3,215,370 | A | 11/1965 | Strydom | |
| 4,557,666 | A * | 12/1985 | Baskin et al. | 416/32 |
| 5,570,859 | A * | 11/1996 | Quandt | 244/213 |
| 2008/0145220 | A1 | 6/2008 | Yeh et al. | |
| 2008/0292461 | A1 * | 11/2008 | Stiesdal | 416/147 |
| 2009/0028705 | A1 * | 1/2009 | Meldgaard et al. | 416/23 |

OTHER PUBLICATIONS

Johannes Ahrenkiel-Frellsen; First Technical Examination Report issued in related Danish Patent Application No. PA 2009 00708; Jan. 22, 2010; 4 pages; Denmark Patent and Trademark Office.

* cited by examiner

*Primary Examiner* — Nathaniel Wiehe

(74) *Attorney, Agent, or Firm* — Wood, Herron & Evans, L.L.P.

(57) ABSTRACT

A rotor blade for a wind turbine comprises a rotor blade body with a root for connecting the rotor blade to a hub of a wind turbine, a tip, a leading edge and a trailing edge. The blade has a movable part, and motion transmitting means for connecting to an actuator being placed preferably outside the blade body, and transmitting motion from the actuator to the movable part. The motion transmitting means is electrically non-conductive, whereby the risk of lightning stroke accidents is reduced.

20 Claims, 2 Drawing Sheets

ACTUATION OF MOVABLE PARTS OF A WIND TURBINE ROTOR BLADE

CROSS-REFERENCE TO RELATED APPLICATIONS

This application claims priority under 35 U.S.C. §119(a) to DK Application No. PA 2009 00708, filed Jun. 8, 2009. This application also claims the benefit of U.S. Provisional Application No. 61/184,882, filed Jun. 8, 2009. Each of these applications is incorporated by reference herein in its entirety.

TECHNICAL FIELD

The invention relates to wind turbines and in particular to regulation and adjustment of the rotor blades of a wind turbine for modifying the aerodynamic properties of the rotor blades.

BACKGROUND

Rotor blades of wind turbines are mounted with their longitudinal axis extending transversely to the axis of the drive shaft and the hub of the wind turbine. The pitch of the rotor blades may be adjusted by rotating the rotor blades about their longitudinal axis, whereby their individual aerodynamic properties and performance are modified and the overall performance of the wind turbine is adapted to the actual conditions such as wind speed and load.

Rotor blades of wind turbines may also have movable parts such as one or more flaps along their trailing edge. Such movable parts may be moved individually to further modify and improve the aerodynamic properties of the rotor blade. Such movable parts can be actuated to move by means of an actuator situated within the blade near the movable part or preferably in the hub or in the root of the blade, i.e. near the hub, or possibly in the nacelle of a wind turbine.

Electrically conductive objects such as metal components in or at a rotor blade may potentially attract lightning and lightning strokes can be destroying and should be avoided. This applies in particular to actuating rods, shafts and wires but also to electrical cables and conductors.

SUMMARY

The invention provides a rotor blade for a wind turbine addressing this situation. The rotor blade comprises a rotor blade body with a root for connecting the rotor blade to a hub of a wind turbine, a tip, a longitudinal axis extending between the root and the tip, a leading edge and a trailing edge. The rotor blade has a movable part and motion transmitting means for connecting to an actuator and transmitting motion from the actuator to the movable part, and the motion transmitting means is electrically non-conductive, whereby the risk of lightning stroke accidents is reduced.

The motion transmitting means is preferably connectable to the actuator being outside the blade body whereby the motion transmitting means does not introduce electrically conductive parts into the rotor blade.

The movable part can be a flap at the trailing edge of the rotor blade, and the motion transmitting means may comprise a shaft for transmitting linear and/or rotary motion for activating the one or more flaps. The motion transmitting means of the rotor blade can comprise a composite material such as a glass fibre or carbon fibre reinforced material which are particular suitable for use in rotor blades. The rotor blade can further comprise a spring arranged so as to load the movable part towards a neutral position, whereby it is ensured that the flaps will assume the neutral position should the actuating mechanism fail. Further, a clutch is preferably arranged between the actuator and each flap.

DETAILED DESCRIPTION

Figure 1:
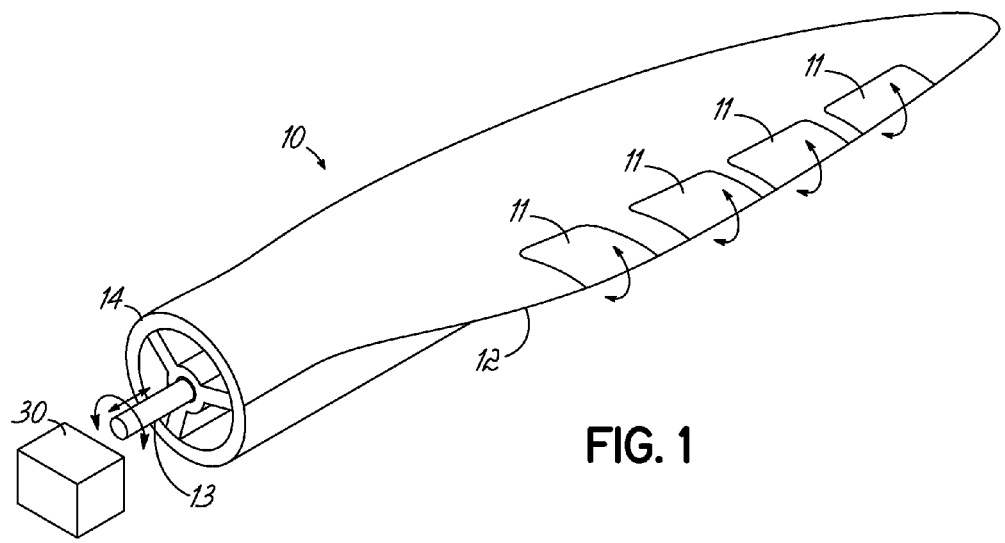
FIG. 1 shows a rotor blade for a wind turbine with movable flaps at its trailing edge.

In FIG. 1 is shown a rotor blade 10 for a wind turbine with movable flaps 11 at its trailing edge 12. A shaft 13 at the root end 14 of the rotor blade 10 is connectable to an actuator 30 which is shown only schematically.

Figure 2:
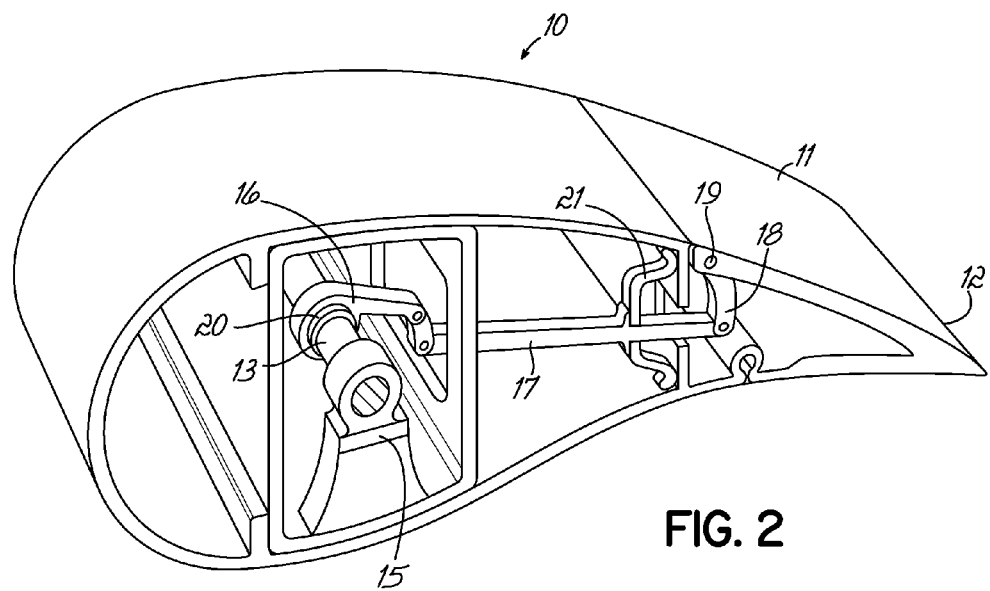
FIG. 2 shows schematically the interior of a section of a rotor blade for a wind turbine in an embodiment of the invention.

In FIG. 2 is illustrated the interior of the rotor blade 10 in FIG. 1. The shaft 13 extends in the interior of the rotor blade, e.g., in a spar as shown, and is supported by a bearing 15. In this embodiment, the shaft 13 is a rotary shaft with a rocker arm 16 driven rotationally by the shaft 13. At its end the rocker arm 16 is connected to a push rod 17 which in turn is connected to an actuation arm 18 within the flap 11. The flap 11 is connected to the rotor blade by means of a hinge 19. When the actuator 30 confers a rotating movement to the shaft 13, this movement will be transferred through the rocker arm 16 and the push rod 17 to the actuation arm 18, and the flap will thereby pivot correspondingly about the hinge 19.

The shaft 13 can be hollow or solid and it is electrically non-conductive or at least of low conductivity. Suitable materials for the shaft 13 include glass or carbon fibre enforced composite materials. Also other components such as the rocker arm 16, the push rod 17 and the actuation arm 18 can advantageously be made of an electrically non-conductive material.

Figure 3:
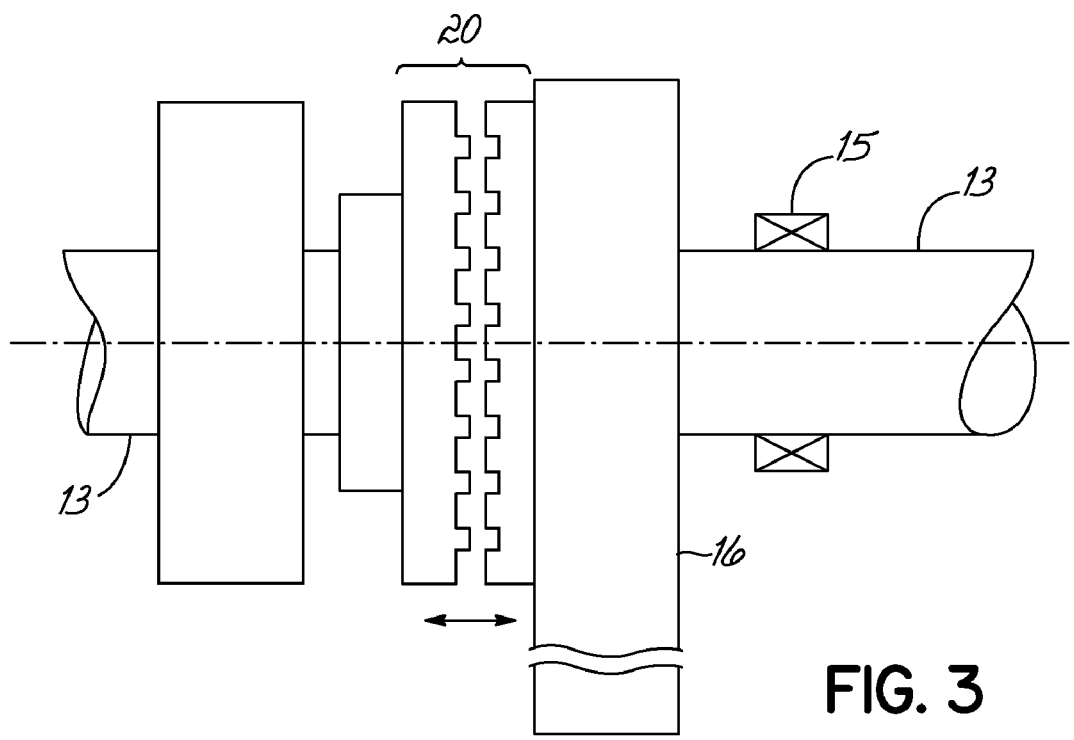
FIG. 3 shows a clutch in the motion transmitting means of the structure in FIG. 2.

In FIG. 3 is shown the shaft 13 with the rocker arm 16 and the bearing 15. A clutch 20, in the shown embodiment a dog clutch, has a fixed part rigidly connected to the shaft 13 and a part that is movable axially relative to the shaft. The movable part is movable into and out of engagement with the fixed part. When the movable part and the fixed part are in engagement they are rotationally locked to each other and rotary motion can be transmitted between the corresponding shafts. Other types of clutches may also be used. The clutch 20 is shown near the rocker arm 16 in FIG. 2 but the clutch may also be arranged elsewhere, for example, at the actuator 30. A shaft 13 may be arranged for each flap 11, or one shaft may drive two or more flaps and a clutch may then be arranged for each flap, whereby the flaps can be operated individually or in combination. The clutch can be remotely operated using electromagnetic, pneumatic or hydraulic means such as, for example, from a controller in the nacelle of a wind turbine. The skilled person will know how to implement such construction, which is therefore not described in detail here.

In the shown embodiment the shaft is a rotary shaft that can transmit rotary motion. In cases where a linear motion is needed the shaft may be a push rod or a wire capable of transmitting push and/or pull forces. In order to ensure proper functioning of the mechanism and correct positioning of the flaps feedback from position or force sensors can be used in a closed loop control system.

In FIG. 2 is also shown a spring 21 such as a leaf spring acting on the push rod 17 and a structure of the rotor blade so as to load the push rod and the flap towards a neutral position. When the clutch is released the spring 21 will cause the flap to return to the neutral position.

What is claimed is:

1. A rotor blade for a wind turbine, the rotor blade comprising:
    a rotor blade body with a root for connecting the rotor blade to a hub of a wind turbine, a tip, a leading edge and a trailing edge;
    a movable part; and
    motion transmitting means for connecting to an actuator and transmitting motion from the actuator to the movable part, wherein the motion transmitting means is electrically non-conductive, and wherein the motion transmitting means is connectable to the actuator outside the blade body.

2. The rotor blade of claim 1 wherein the movable part is a flap at the trailing edge.

3. The rotor blade of claim 1 wherein the motion transmitting means comprises a shaft for transmitting linear and/or rotary motion.

4. The rotor blade of claim 1 wherein the motion transmitting means comprises a composite material.

5. The rotor blade of claim 4 wherein the composite material includes a glass fibre or a carbon fibre reinforced material.

6. The rotor blade of claim 1 further comprising a spring arranged so as to load the movable part towards a neutral position.

7. The rotor blade of claim 1 wherein a clutch is arranged between the actuator and the movable part.

8. A rotor blade for a wind turbine, comprising:
    a rotor blade body with a root for connecting the rotor blade to a hub of a wind turbine, a tip, a leading edge and a trailing edge;
    a movable part; and
    a shaft for connecting to an actuator and transmitting linear and/or rotary motion form the actuator to the movable part, wherein the shaft is electrically non-conductive.

9. The rotor blade of claim 8 wherein the shaft is connectable to the actuator being outside the blade body.

10. The rotor blade of claim 8 wherein the movable part is a flap at the trailing edge.

11. The rotor blade of claim 8 wherein the shaft comprises a composite material.

12. The rotor blade of claim 8 further comprising a spring arranged so as to load the movable part towards a neutral position.

13. The rotor blade of claim 8 wherein a clutch is arranged between the actuator and the movable part.

14. A rotor blade for a wind turbine, comprising:
    a rotor blade body with a root for connecting the rotor blade to a hub of a wind turbine, a tip, a leading edge and a trailing edge;
    a movable part;
    a spring arranged so as to load the movable part towards a neutral position; and
    motion transmitting means for connecting to an actuator and transmitting motion from the actuator to the movable part, wherein the motion transmitting means is electrically non-conductive.

15. The rotor blade of claim 14 wherein the motion transmitting means is connectable to the actuator outside the blade body.

16. The rotor blade of claim 14 wherein the movable part is a flap at the trailing edge.

17. The rotor blade of claim 14 wherein the motion transmitting means comprises a shaft for transmitting linear and/or rotary motion.

18. The rotor blade of claim 14 wherein a clutch is arranged between the actuator and the movable part.

19. A rotor blade for a wind turbine, the rotor blade comprising:
    a rotor blade body with a root for connecting the rotor blade to a hub of a wind turbine, a tip, a leading edge and a trailing edge;
    a movable part;
    motion transmitting means for connecting to an actuator and transmitting motion from the actuator to the movable part, wherein the motion transmitting means is electrically non-conductive; and
    a clutch arranged between the actuator and the movable part.

20. The rotor blade of claim 19 further comprising a spring arranged so as to load the movable part towards a neutral position.

* * * * *

UNITED STATES PATENT AND TRADEMARK OFFICE
CERTIFICATE OF CORRECTION

PATENT NO. : 8,186,936 B2  
APPLICATION NO. : 12/795913  
DATED : May 29, 2012  
INVENTOR(S) : Srikanth Narasimalu Page 1 of 1

It is certified that error appears in the above-identified patent and that said Letters Patent is hereby corrected as shown below:

Column 3, Line 39, Claim 8, "... and/or rotary motion form the actuator..." should read --... and/or rotary motion from the actuator ...--

Signed and Sealed this  
Twenty-third Day of October, 2012

David J. Kappos  
*Director of the United States Patent and Trademark Office*